(12) United States Patent
Kamata et al.

(10) Patent No.: US 9,941,515 B2
(45) Date of Patent: *Apr. 10, 2018

(54) NICKEL-COBALT-MANGANESE COMPOSITE HYDROXIDE AND METHOD FOR PRODUCING SAME

(71) Applicant: SUMITOMO METAL MINING CO., LTD., Tokyo (JP)

(72) Inventors: Yasutaka Kamata, Ehime (JP); Hiroyuki Toya, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 92 days.

This patent is subject to a terminal disclaimer.

(21) Appl. No.: 14/898,924

(22) PCT Filed: Jun. 13, 2014

(86) PCT No.: PCT/JP2014/065723
§ 371 (c)(1),
(2) Date: Dec. 16, 2015

(87) PCT Pub. No.: WO2014/203815
PCT Pub. Date: Dec. 24, 2014

(65) Prior Publication Data
US 2016/0293950 A1    Oct. 6, 2016

(30) Foreign Application Priority Data

Jun. 19, 2013 (JP) ................... 2013-128887

(51) Int. Cl.
| | |
|---|---|
| C01G 53/04 | (2006.01) |
| H01M 4/525 | (2010.01) |
| C01G 53/00 | (2006.01) |
| H01M 4/505 | (2010.01) |
| H01M 10/0525 | (2010.01) |
| H01M 4/02 | (2006.01) |

(52) U.S. Cl.
CPC .......... H01M 4/525 (2013.01); C01G 53/006 (2013.01); C01G 53/50 (2013.01); H01M 4/505 (2013.01); C01P 2002/50 (2013.01); C01P 2002/52 (2013.01); C01P 2002/74 (2013.01); C01P 2004/03 (2013.01); C01P 2004/84 (2013.01); C01P 2006/12 (2013.01); C01P 2006/14 (2013.01); C01P 2006/40 (2013.01); H01M 10/0525 (2013.01); H01M 2004/028 (2013.01); H01M 2220/20 (2013.01)

(58) Field of Classification Search
CPC ..... C01G 53/006; C01G 53/50; H01M 4/505; H01M 4/525
USPC ........ 252/521.1, 519.1, 519.2, 519.15, 520.2
See application file for complete search history.

(56) References Cited

U.S. PATENT DOCUMENTS

| | | | |
|---|---|---|---|
| 9,231,250 B2 * | 1/2016 | Kase ..................... | H01M 4/505 |
| 9,553,311 B2 * | 1/2017 | Kase ..................... | H01M 4/485 |
| 2006/0083989 A1 | 4/2006 | Suhara et al. | |
| 2008/0241053 A1 | 10/2008 | Suhara et al. | |
| 2009/0302267 A1 | 12/2009 | Albrecht et al. | |
| 2012/0244413 A1 * | 9/2012 | Shimano .................. | C01G 1/02 429/144 |
| 2012/0270107 A1 * | 10/2012 | Toya .................... | C01G 53/006 429/223 |
| 2012/0282525 A1 * | 11/2012 | Nagai ................... | H01M 4/505 429/223 |
| 2012/0305861 A1 | 12/2012 | Albrecht et al. | |
| 2014/0087263 A1 * | 3/2014 | Matsumoto ........... | H01M 4/505 429/223 |
| 2014/0106228 A1 * | 4/2014 | Toya .................... | C01G 53/006 429/223 |
| 2014/0186710 A1 * | 7/2014 | Ryoshi .................. | C01D 15/02 429/223 |
| 2015/0024207 A1 * | 1/2015 | Kase ..................... | H01M 4/505 428/402 |
| 2016/0133927 A1 * | 5/2016 | Kamata ................. | H01M 4/505 252/182.1 |
| 2016/0293952 A1 * | 10/2016 | Kaneda ................. | H01M 4/525 |

FOREIGN PATENT DOCUMENTS

| | | | |
|---|---|---|---|
| JP | H10-81522 A | 3/1998 | |
| JP | 2001-351630 A | 12/2001 | |
| JP | 2003-059490 A | 2/2003 | |
| JP | 2008-195608 A | 8/2008 | |
| JP | 2009-515799 A | 4/2009 | |
| WO | 2004/092073 A1 | 10/2004 | |
| WO | 2012/169274 A1 | 12/2012 | |
| WO | WO 2012164763 A1 * | 12/2012 | .......... C01G 53/006 |
| WO | WO 2013125451 A1 * | 8/2013 | .......... H01M 4/505 |

OTHER PUBLICATIONS

Sep. 9, 2014 Search Report issued in International Patent Application No. PCT/JP2014/065723.

* cited by examiner

*Primary Examiner* — Douglas J McGinty
(74) *Attorney, Agent, or Firm* — Oliff PLC

(57) ABSTRACT

Achieved is a nickel-cobalt-manganese composite hydroxide which is excellent in reactivity with a lithium compound, and excellent thermal stability and battery characteristics. The nickel-cobalt-manganese composite hydroxide is represented by a general formula: $Ni_{1-x-y-z}Co_xMn_yM_z$ $(OH)_2$ ($0<x\leq 1/3$, $0<y\leq 1/3$, $0\leq z\leq 0.1$, M represents one or more elements selected from Mg, Al, Ca, Ti, V, Cr, Zr, Nb, Mo, and W), to serve as a precursor for a positive electrode active material of a non-aqueous electrolyte secondary battery, and the nickel-cobalt-manganese composite hydroxide has a specific surface area of 3.0 to 11.0 m²/g as measured by a nitrogen adsorption BET method, and a ratio I(101)/I(100) of peak intensity I(101) of plane (101) to peak intensity I(100) of plane (100) less than 0.300 through an X-ray diffraction measurement.

10 Claims, 1 Drawing Sheet

NICKEL-COBALT-MANGANESE COMPOSITE HYDROXIDE AND METHOD FOR PRODUCING SAME

BACKGROUND OF THE INVENTION

Field of the Invention

The present invention relates to a nickel-cobalt-manganese composite hydroxide which serves as a precursor for a positive electrode active material of a non-aqueous electrolyte secondary battery, and a production method therefor, and more particularly, relates to a nickel-cobalt-manganese composite hydroxide which serves as a precursor for a positive electrode active material of a lithium ion secondary battery, and a production method therefor. The present application claims priority based on the Japanese Patent Application No. 2013-128887 filed on Jun. 19, 2013 in Japan, which is incorporated by reference herein.

Description of Related Art

Conventionally, smaller and lighter secondary batteries which have high energy densities have been required with popularization of mobile devices such as cellular phones and laptop personal computers. Batteries preferred for these applications include lithium ion secondary batteries, which have been actively researched and developed.

Furthermore, also in a field of automobiles, a demand for electric vehicles has been increased from resource and environmental perspectives, and lithium ion secondary batteries which are small and light, high in discharging capacity, with favorable cycle characteristics have been required as power sources for electric vehicles and hybrid automobiles. In particular, for power sources for automobiles, output characteristics are important, and lithium ion secondary batteries have been required which have favorable output characteristics.

Lithium ion secondary batteries that use, for positive electrode active materials, lithium-containing composite oxides, in particular, relatively easily synthesized lithium-cobalt composite oxides ($LiCoO_2$) achieve high voltages on the order of 4 V grade, and have been thus progressively put into practical use as batteries with high energy densities. Further, a large number of lithium ion secondary batteries that use this type of lithium-cobalt composite oxides have ever been developed for achieving excellent initial capacity characteristics and cycle characteristics, and various results have been already achieved.

However, the lithium-cobalt composite oxides cause, because of the use of expensive cobalt compounds for raw materials, increases in the cost of active materials and thus batteries, and improved active materials have been desired. The battery that uses the lithium-cobalt composite oxide has a significantly higher unit price per capacity than a nickel-hydrogen battery, and thus has a considerably limited use application. Therefore, there are great expectations to lower the cost of active materials, thereby allowing the manufacture of more inexpensive lithium ion secondary batteries not only small-size secondary batteries for currently popular portable devices, but also for large-size secondary batteries, e.g., for electricity storage, and for electric vehicles, and the achievement of the manufacture can be considered to have industrially enormous significance.

In this regard, 4 V-grade positive electrode active materials that are more inexpensive than lithium-cobalt composite oxides, that is, lithium-nickel-cobalt-manganese composite oxides that have a composition of $Li[Ni_{1/3}Co_{1/3}Mn_{1/3}]O_2$ with nickel:cobalt:manganese substantially of 1:1:1 in atomic ratio have been attracting attention as new materials of positive electrode active materials for lithium ion secondary batteries. The lithium-nickel-cobalt-manganese composite oxides have been actively developed, because of not only their inexpensiveness, but also because of exhibiting higher thermal stability than lithium ion secondary batteries that use a lithium-cobalt composite oxide or a lithium-nickel composite oxide for a positive electrode active material.

In order for lithium ion secondary batteries to provide favorable battery characteristics, the lithium-nickel-cobalt-manganese composite oxides as positive electrode active materials need to have moderate particle sizes and specific surface areas, and also have high densities. These properties of the positive electrode active materials strongly reflect the properties of nickel-cobalt-manganese composite hydroxides as precursors, and similar properties are thus required for the nickel-cobalt-manganese composite hydroxides.

Furthermore, in order to obtain positive electrode active materials that provide favorable battery characteristics, nickel-cobalt-manganese composite hydroxides are required which are likely to cause reactions with lithium compounds to proceed even in an atmosphere of a water vapor or a carbon dioxide gas generated during syntheses with the lithium compounds, and excellent in reactivity. Nickel-cobalt-manganese composite hydroxides which are poor in reactivity with lithium compounds make reactions with nickel-cobalt-manganese composite hydroxides incomplete during syntheses with the lithium compounds, thereby producing residual unreacted lithium compounds. In addition, there is the problem of melting the lithium compounds, thereby causing agglomeration, before completing the reactions between the nickel-cobalt-manganese composite hydroxides and the lithium compounds.

In regard to nickel-cobalt-manganese composite hydroxides to serve as precursors for positive electrode active materials, various suggestions have been made as will be described below. However, while the increase in density has been examined in each of the suggestions, surface properties or the reactivity with lithium compounds have not been taken into full account.

For example, Patent Literature 1 proposes continuously supplying an aqueous solution of a nickel salt, which contains a cobalt salt and a manganese salt, a complexing agent, and an alkali metal hydroxide, in an inert gas atmosphere or in the presence of a reductant in a reaction vessel, and continuously extracting crystals obtained through continuous crystal growth, thereby providing a spherical high-density cobalt-manganese co-precipitated nickel hydroxide that has a tap density of 1.5 $g/cm^3$ or more, an average particle size of 5 to 20 μm, and a specific surface area of 8 to 30 $m^2/g$.

The co-precipitated nickel hydroxide obtained can be used as a raw material for lithium-nickel-cobalt-manganese composite oxides. However, this co-precipitated nickel hydroxide has, according to an example, a tap density of 1.71 to 1.91 $g/cm^3$, which is less than 2.0 $g/cm^3$, which can be thus considered to be an insufficiently high density. On the other hand, any specific numerical value is not mentioned for the specific surface area, it is not clear whether the specific surface area is made appropriate or not, and the reactivity with lithium compounds has not been examined. Therefore, even when this co-precipitated nickel hydroxide is used as a precursor, any lithium-nickel-cobalt-manganese composite oxide will not be obtained which has favorable battery characteristics.

In addition, Patent Literature 2 suggests a method for producing a lithium-nickel-cobalt-manganese composite oxide, which includes: a step 1 of reacting and co-precipitating mixed aqueous solution of a nickel salt, a cobalt salt, and a manganese salt with nickel:cobalt:manganese of substantially 1:1:1 in atomic ratio in the presence of a complexing agent in an aqueous solution, with pH of 9 to 13 with an alkali solution under an inert gas atmosphere, thereby providing a nickel-cobalt-manganese composite hydroxide and/or a nickel-cobalt-manganese composite oxide with nickel:cobalt:manganese of substantially 1:1:1 in atomic ratio; and a step 2 of firing a mixture of the hydroxide and/or the oxide with a lithium compound at 700° C. or higher so that the atomic ratio of lithium to the total atomic ratio of nickel, cobalt, and manganese is substantially 1:1. Also in this proposal, the obtained nickel-cobalt-manganese composite hydroxide has a tap density of 1.95 g/cm$^3$, which is less than 2.0 g/cm$^3$, and a very large specific surface area of 13.5 m$^2$/g. Moreover, the reactivity with lithium compounds has not been examined either.

Accordingly, nickel-cobalt-manganese composite hydroxides have been desired which have favorable reactivity with lithium compounds, and make it possible to produce nickel-cobalt-manganese composite oxides such that favorable battery characteristics are achieved.

PRIOR ART

Patent Document

Patent Literature 1: Japanese Patent Application Laid-Open (JP-A) No. 2008-195608
Patent Literature 2: JP-A No. 2003-59490

BRIEF SUMMARY OF THE INVENTION

Problems to be Solved by the Invention

Therefore, an object of the present invention is to provide a nickel-cobalt-manganese composite hydroxide which is excellent in reactivity with a lithium compound, and is able to achieve a positive electrode active material for a non-aqueous electrolyte secondary battery which has excellent thermal stability and at the same time, also has excellent battery characteristics, and a method for producing the nickel-cobalt-manganese composite hydroxide.

Means to Solve the Problem

The present inventors have, in order to solve the problems mentioned above, earnestly researched the influences of nickel-cobalt-manganese composite hydroxides on the reactivity with lithium compounds to obtain a finding that the reactivity is greatly affected by the specific surface area measured by a nitrogen adsorption BET method and the ratio I(101)/I(100) of peak intensity I(101) of plane (101) to peak intensity I(100) of plane (100) through an X-ray diffraction measurement, thereby completing the present invention.

The nickel-cobalt-manganese composite hydroxide according to the present invention for achieving the object mentioned above is a nickel-cobalt-manganese composite hydroxide represented by a general formula: $Ni_{1-x-y-z}Co_xM n_yM_z$ (OH)$_2$ ($0 \le x \le \frac{1}{3}$, $0 \le y \le \frac{1}{3}$, $0 \le z \le 0.1$, M represents one or more elements selected from Mg, Al, Ca, Ti, V, Cr, Zr, Nb, Mo, and W), to serve as a precursor for a positive electrode active material of a non-aqueous electrolyte secondary battery, the nickel-cobalt-manganese composite hydroxide is characterized by having a specific surface area of 3.0 to 11.0 m$^2$/g as measured by a nitrogen adsorption BET method, and a ratio I(101)/I(100) of peak intensity I(101) of plane (101) to peak intensity I(100) of plane (100) less than 0.300 through an X-ray diffraction measurement.

The method for producing a nickel-cobalt-manganese composite hydroxide according to the present invention for achieving the object mentioned above is a method for producing the nickel-cobalt-manganese composite hydroxide, which includes: a crystallization step of mixing, in a reaction vessel, a mixed aqueous solution containing at least a nickel salt, a cobalt salt, and a manganese salt, and an aqueous solution containing an ammonium ion supplier, and supplying an aqueous solution of caustic alkali so that the pH on the basis of a liquid temperature of 25° C. is kept in a range of 11 to 13, thereby providing a reaction solution, and crystallizing nickel-cobalt-manganese composite hydroxide particles in the reaction solution; an oxidation step of supplying an oxidant to slurry of the nickel-cobalt-manganese composite hydroxide particles formed in the crystallization step to oxidize the nickel-cobalt-manganese composite hydroxide particles, thereby making a ratio I(101)/I(100) of peak intensity I(101) of plane (101) to peak intensity I(100) of plane (100) through an X-ray diffraction measurement less than 0.300; a solid-liquid separation step of applying solid-liquid separation and water washing to the oxidized nickel-cobalt-manganese composite hydroxide particles; and a drying step of drying the nickel-cobalt-manganese composite hydroxide particles subjected to the solid-liquid separation.

Effect of the Invention

The present invention is able to provide a nickel-cobalt-manganese composite hydroxide to serve as a precursor for a positive electrode active material of a non-aqueous electrolyte secondary battery, which is excellent in reactivity with a lithium compound, and provide a non-aqueous electrolyte secondary battery which has excellent thermal stability and also excellent battery characteristics, when a lithium-nickel-cobalt-manganese composite oxide obtained with the nickel-cobalt-manganese composite hydroxide as a precursor is used as a positive electrode active material of a non-aqueous electrolyte secondary battery. Furthermore, the present invention is able to easily produce nickel-cobalt-manganese composite hydroxides on an industrial scale, and extremely high in industrial value.

DETAILED DESCRIPTION OF THE INVENTION

A nickel-cobalt-manganese composite hydroxide and a production method therefor to which the present invention is applied will be described in detail below. It is to be noted that the present invention is not limited to the following detailed description, unless otherwise stated. Embodiments according to the present invention will be described in the following order:
1. a nickel-cobalt-manganese composite hydroxide
2. The method for producing a nickel-cobalt-manganese composite hydroxide
2-1. Crystallization step
2-2. Oxidation step
2-3. Solid-Liquid Separation Step
2-4. Drying Step <1. Nickel-Cobalt-Manganese Composite Hydroxide>

The nickel-cobalt-manganese composite hydroxide according to the present embodiment serve as a precursor for a positive electrode active material of a non-aqueous electrolyte secondary battery, in particular, as a precursor for a positive electrode active material of a lithium ion secondary battery. The nickel-cobalt-manganese composite hydroxide is represented by the general formula: $Ni_{1-x-y-z}Co_xMn_yM_z(OH)_2$ ($0<x\leq\frac{1}{3}$, $0<y\leq\frac{1}{3}$, $0\leq z\leq 0.1$, M represents one or more elements selected from Mg, Al, Ca, Ti, V, Cr, Zr, Nb, Mo, and W), and has a specific surface area of 3.0 to 11.0 m²/g as measured by a nitrogen adsorption BET method, and a ratio[I(101)/I(100)] (hereinafter, simply referred to as a peak intensity ratio) of peak intensity I(101) of plane (101) to peak intensity I(100) of plane (100) less than 0.300 through an X-ray diffraction measurement.

When the specific surface area exceeds 11.0 m²/g, the specific surface area of a positive electrode active material finally obtained is excessively increased, thereby failing to achieve adequate safety. Alternatively, when the specific surface area is less than 3.0 m²/g, the reactivity with a lithium compound is degraded in the synthesis with the lithium compound, thereby causing the reaction to fail to proceed sufficiently, and in an elevated temperature process, the lithium compound is melted, thereby causing agglomeration. Accordingly, in order to increase the safety of the positive electrode active material, and prevent agglomeration, the specific surface area of the nickel-cobalt-manganese composite hydroxide is preferably adapted to fall within the range of 3.0 to 11.0 m²/g.

Furthermore, as will be described later, in the method for producing a nickel-cobalt-manganese composite hydroxide, the nickel-cobalt-manganese composite hydroxide is oxidized to make crystals finer, and reduce a peak intensity ratio through an X-ray diffraction measurement. The peak intensity I(101) of plane (101) which appears around, in particular, 2θ=38° is weakened by making the crystals of the nickel-cobalt-manganese composite hydroxide finer. On the other hand, the degree of how the peak intensity I(100) of plane (100) which appears around 2θ=19° is weakened is lower than that of the I(101). Accordingly, the peak intensity ratio[I(101)/I(100)] can be regarded as an indicator of how the crystals are made fine. More specifically, when the peak intensity ratio is low, it is determined that the crystals of the nickel-cobalt-manganese composite hydroxide are progressively made fine. In this regard, the peak intensity means a peak height in an X-ray diffraction pattern.

With the peak intensity ratio made less than 0.300, fine cracks are generated in particles of the nickel-cobalt-manganese composite hydroxide, thereby allowing the crystals to be made adequately fine, and in mixing with a lithium compound and firing, the melted lithium compound adequately penetrates into secondary particles, and the reactivity with the lithium compound is significantly improved by the effect of accelerating the reaction due to the fineness.

With the peak intensity ratio of 0.300 or more, insufficiently fine crystals of the nickel-cobalt-manganese composite hydroxide degrades the reactivity with a lithium compound, thereby causing the reaction to fail to proceed sufficiently during firing, and in an elevated temperature process, the lithium compound is melted, thereby causing agglomeration.

On the other hand, the peak intensity ratio is preferably adjusted to 0.070 or more. With the peak intensity ratio made less than 0.070, the crystals of the nickel-cobalt-manganese composite hydroxide may be excessively made finer, thereby resulting in a specific surface area in excess of 11.0 m²/g.

Furthermore, the nickel-cobalt-manganese composite hydroxide preferably has, in order to further enhance the reactivity, a mesopore volume of 0.010 to 0.035 ml/g, more preferably 0.010 to 0.030 ml/g as measured by a nitrogen adsorption method. With the mesopore volume less than 0.010 ml/g, insufficient penetration of lithium carbonate melted into particles in the synthesis may decrease the reactivity with the lithium compound. On the other hand, with the mesopore volume in excess of 0.035 ml/g, the specific surface area may be excessively increased, thereby failing to achieve adequate safety.

In addition, the nickel-cobalt-manganese composite hydroxide is preferably 5 to 15 µm in average particle size, and preferably 2.0 g/cm³ or more in tap density. This can further improve battery performance.

The additive element represented by M in the general formula is added to improve battery characteristics such as cycle characteristics and output characteristics. When the atomic ratio z of the additive element M exceeds 0.1, the metal element contributing to the Redox reaction is unfavorably reduced, thereby decreasing the battery capacity. Accordingly, the additive element M is adjusted to be 0.1 or less in atomic ratio z.

The foregoing nickel-cobalt-manganese composite hydroxide is preferred as a precursor of a positive electrode active material of a non-aqueous electrolyte secondary battery, and can be made into a positive electrode active material of a non-aqueous electrolyte secondary battery by a common manufacturing method.

For example, as a method for producing the nickel-cobalt-manganese composite oxide which serves as a positive electrode active material of a lithium ion secondary battery, first, the nickel-cobalt-manganese composite hydroxide is left as it is, or subjected to heat treatment at a temperature of 800° C. or lower. Next, a lithium compound is mixed so that the lithium is 0.95 to 1.5 in atomic ratio with respect to the metal element of the nickel-cobalt-manganese composite hydroxide, and subjected to firing at 800 to 1000° C. Thus, the nickel-cobalt-manganese composite oxide can be obtained.

The above-described nickel-cobalt-manganese composite hydroxide has a specific surface area of 3.0 to 11.0 m²/g as measured by a nitrogen adsorption BET method, and a peak intensity ratio of less than 0.300 through an X-ray diffraction measurement, the nickel-cobalt-manganese composite hydroxide is thus excellent in reactivity with a lithium compound and likely to cause the reaction with the lithium compound to proceed, and the reaction with the lithium compound proceeds preferentially rather than the melting of the lithium compound, thereby making it possible to prevent agglomeration from being caused.

Thermogravimetric measurement and differential thermal analysis (TG-DTA) in an inert atmosphere can be used as methods for evaluating the nickel-cobalt-manganese composite hydroxide for the reactivity with the lithium compound and ease of agglomeration. For example, when the nickel-cobalt-manganese composite hydroxide is mixed with a lithium carbonate, and then subjected to a TG-DTA measurement in a carbon dioxide gas atmosphere, thereby resulting in degraded reactivity of the nickel-cobalt-manganese composite hydroxide, the unreacted lithium carbonate is left after elevating the temperature, and the DTA curve has an endothermic peak derived from the melting of the lithium carbonate, which is observed around 680 to 720° C. In addition, the sample after the TG-DTA measurement can be subjected to observation by SEM to confirm the presence or absence of agglomeration.

The foregoing nickel-cobalt-manganese composite hydroxide which has a specific surface area of 3.0 to 11.0 $m^2/g$ as measured by a nitrogen adsorption BET method, and a peak intensity ratio of less than 0.300 through an X-ray diffraction measurement, is thus excellent in reactivity with a lithium compound, and kept from being agglomerated. When the nickel-cobalt-manganese composite hydroxide is used as a precursor for a positive electrode active material of a non-aqueous electrolyte secondary battery as just described, a non-aqueous electrolyte secondary battery can be obtained which has excellent battery characteristics while being excellent in thermal stability.

<2. Method for Producing Nickel-Cobalt-Manganese Composite Hydroxide>

Next, a method will be described for producing the nickel-cobalt-manganese composite hydroxide described above.

In the method for producing the nickel-cobalt-manganese composite hydroxide, first, a reaction solution is obtained by mixing, in a reaction vessel, a mixed aqueous solution containing at least a nickel salt, a cobalt salt, and a manganese salt with an aqueous solution containing an ammonium ion supplier, and supplying an aqueous solution of caustic alkali so that the pH on the basis of a liquid temperature of 25° C. is maintained within the range of 11 to 13, nickel-cobalt-manganese composite hydroxide particles are crystallized in the reaction solution. Next, an oxidant is supplied to the obtained slurry of nickel-cobalt-manganese composite hydroxide particles to oxidize the nickel-cobalt-manganese composite hydroxide particles, and the nickel-cobalt-manganese composite hydroxide particles are subjected to solid-liquid separation, and then dried to obtain nickel-cobalt-manganese composite hydroxide particles.

In the method for producing the nickel-cobalt-manganese composite hydroxide, the nickel-cobalt-manganese composite hydroxide particles are oxidized to reduce the peak intensity ratio of the nickel-cobalt-manganese composite hydroxide particles through an X-ray diffraction measurement, and increase the specific surface area. This nickel-cobalt-manganese composite hydroxide is excellent in reactivity with a lithium compound, and serves as a precursor for a positive electrode active material which has excellent thermal stability and battery characteristics.

Each step will be described in detail below in regard to the method for producing the nickel-cobalt-manganese composite hydroxide.

(2-1) Crystallization Step

In the crystallization step, a reaction solution is obtained by mixing a mixed aqueous solution containing at least a nickel salt, a cobalt salt, and a manganese salt with an aqueous solution containing an ammonium ion supplier, and supplying an aqueous solution of caustic alkali so that the pH on the basis of a liquid temperature of 25° C. is maintained within the range of 11 to 13, and nickel-cobalt-manganese composite hydroxide particles are crystallized in the reaction solution.

In the crystallization step, the temperature of the reaction solution is preferably maintained at 20 to 70° C. This grows crystals of the nickel-cobalt-manganese composite hydroxide. With the temperature of the reaction solution lower than 20° C., the low solution of the salt in the reaction solubility lowers the salt concentration, thus failing to sufficiently grow crystals of the nickel-cobalt-manganese composite hydroxide. Alternatively, when the temperature of the reaction solution exceeds 70° C., the generation of many crystal nuclei results in many fine particles, thus failing to provide a high density of nickel-cobalt-manganese composite hydroxide particles.

In addition, in the crystallization step, the pH on the basis of a liquid temperature of 25° C. is controlled to fall within the range of 11 to 13, preferably 11 to 12. The pH less than 11 makes particles of the nickel-cobalt-manganese composite hydroxide coarse, and moreover, after the reaction, causes nickel to remain in the liquid, thereby leading to a loss of nickel. Alternatively, the pH in excess of 13 increases the crystallization rate of the nickel-cobalt-manganese composite hydroxide, thereby resulting in many fine particles. With too many fine particles, a problem is caused which is that the particles are made sintered, thereby producing an agglomerated powder.

The pH of the reaction solution can be controlled by supplying an aqueous solution of caustic alkali. The aqueous solution of caustic alkali is not particularly limited, but for example, an alkali metal hydroxide aqueous solution, such as sodium hydroxide or potassium hydroxide can be used. The alkali metal hydroxide can be also directly added to the reaction solution, but is preferably added as an aqueous solution from the perspective of ease of pH control. The method of adding the aqueous solution of caustic alkali is also not particularly limited, but while adequately stirring the reaction solution, the aqueous solution of caustic alkali may be added with a pump that is able to control the flow rate, such as a metering pump, so that the pH on the basis of a liquid temperature of 25° C. falls within the range of 11 to 13.

Furthermore, in the crystallization step, nickel-cobalt-manganese composite hydroxide particles are preferably generated by co-precipitation in a non-oxidizing atmosphere or in the presence of a reductant. When the particles are generated in an oxidizing atmosphere or in the absence of a reductant, the cobalt and the manganese may be oxidized, thereby making new nuclei likely to be generated, and excessively increasing the specific surface area due to fine primary particles. Moreover, spherical secondary particles are not able to grow to large sizes, the average particle size may be thus made excessively small. In addition, when the specific surface area of the nickel-cobalt-manganese composite hydroxide particles is excessively increased in the crystallization step, it may be difficult to control the specific surface area and the peak intensity ratio in the oxidation step as a subsequent step.

In the crystallization step, a non-oxidizing atmosphere is preferably achieved by maintaining the oxygen concentration in the atmosphere in a reaction vessel in contact with an open side of the reaction solution at 0.2 volume % or less. Maintaining the oxygen concentration at 0.2 volume % or less, the oxidation of the metal elements, in particular, manganese in the reaction solution is suppressed to develop primary particles, and thus obtain highly crystalline spherical secondary particles, thereby making it possible to prevent the increase in specific surface area and the decrease in average particle size.

When the oxygen concentration exceeds 0.2 volume %, primary particles are made fine, thereby increasing crystal interfaces, and the nickel-cobalt-manganese composite hydroxide obtained may thus have a specific surface area in excess of 11.0 m$^2$/g. In addition, the average particle size may be excessively decreased. The lower limit of the oxygen concentration is not particularly limited, but the decreased specific surface area, the increased average particle size, and also the decreased carbon content are obtained with decreasing oxygen concentration, and the oxygen concentration may be thus adjusted within the range of 0.2 volume % or less and an industrially possible range to allow control to a desired specific surface area and average particle size. The carbon content is preferably 0.1 mass % or less in the nickel-cobalt-manganese composite hydroxide. The carbon content can be measured by a high frequency-infrared combustion method.

In order to adjust the oxygen concentration in the reaction vessel to 0.2 volume % or less, for example, an inert gas is preferably used because it is easy to control the concentration by supplying an inert gas into the reaction vessel. In this regard, for the supply of an inert gas into the reaction vessel, there is a need to supply or to continuously supply a sufficient amount of inert atmosphere gas during the crystallization so that the oxygen concentration is maintained at 0.2 volume % or less. Therefore, the adjustment of the oxygen concentration can be easily made by, for example, using a reaction vessel with a lid, and adjusting the amount of inert gas supplied to the reaction vessel. As the inert gas, a nitrogen gas is advantageous in terms of cost, and preferred.

It is to be noted that the adjustment is not limited to the control method mentioned above, because the oxygen concentration has only to be retained at 0.2 volume % or less.

In the crystallization step, even when the oxygen concentration is not maintained at 0.2 volume % or less, it is possible to control the specific surface area and average particle size with primary particle developed and secondary particles increased in size, as long as the addition of a reductant to the reaction solution suppresses oxidation of the metal elements. The reductant may be added to the extent that the oxidation of the metal element is suppressed, and may be any reductant that is able to suppress the oxidation of the metal element, such as hydrazine.

The nickel-cobalt-manganese composite hydroxide obtained in the crystallization step, which is represented by the general formula: $Ni_{1-x-y-z}Co_xMn_yM_z$ $(OH)_2$ ($0<x\le1/3$, $0<y\le1/3$, $0\le z\le0.1$, M represents one or more elements selected from Mg, Al, Ca, Ti, V, Cr, Zr, Nb, Mo, and W), give close agreement with the atomic ratios in the raw material supplied. Therefore, the atomic ratios of the nickel, cobalt, manganese, and additive element M can be adjusted to fall within the ranges in the general formula by adjusting the atomic ratios in the raw material to the atomic ratios in the general formula.

The salt concentration of the mixed aqueous solution of the nickel salt, cobalt salt, and manganese salt is preferably adjusted to 1 mol/L to 2.6 mol/L in total for the respective salts. With the concentration less than 1 mol/L, the low salt concentration results in failure to cause crystals of the nickel-cobalt-manganese composite hydroxide to grow sufficiently. On the other hand, in excess of greater than 2.6 mol/L, which is greater than the saturating concentration at ordinary temperature, there is a risk such as clogging a pipe with redeposition of crystals, and the generation of many crystal nuclei results in many fine particles.

The nickel salt, the cobalt salt, and the manganese salt which can be used herein are not particularly limited, but preferably at least one of sulfates, nitrates, or chlorides.

The ammonium ion supplier for use in the crystallization step is not particularly limited, but preferably at least one of ammonia, ammonium sulfate, or ammonium chloride.

The additive amount of the ammonium ion supplier preferably falls within the range of 5 to 20 g/L in ammonium ion concentration in the reaction solution. In the case of less than 5 g/L in ammonium ion concentration, the low solubility of the nickel, cobalt, and manganese in the reaction solution results in insufficient crystal growth, thus failing to achieve any high-density nickel-cobalt-manganese composite hydroxide. Alternatively, in excess of 20 g/L in ammonium ion concentration, the crystallization rate is decreased, thereby degrading productivity, and more metal ions such as nickel remaining in the solution lead to an increase in cost.

The additive element M, which has one or more elements selected from Mg, Al, Ca, Ti, V, Cr, Zr, Nb, Mo, and W, can be added to the mixed aqueous solution during the crystallization step, or added individually to the reaction solution to provide the nickel-cobalt-manganese composite hydroxide with the composition of the general formula. The additive element M is preferably added as a water-soluble compound, and for example, titanium sulfate, ammonium peroxotitanate, titanium potassium oxalate, vanadium sulfate, ammonium vanadate, chromium sulfate, potassium chromate, zirconium sulfate, zirconium nitrate, niobium oxalate, ammonium molybdate, sodium tungstate, ammonium tungstate, and the like can be used.

When the additive element M is uniformly dispersed within the nickel-cobalt-manganese composite hydroxide particles, an additive containing the additive element may be added to the mixed aqueous solution, and co-precipitation can be achieved while the additive element M is uniformly dispersed within the nickel-cobalt-manganese composite hydroxide particles.

In addition, as a method of adding the additive element M, the surfaces of the nickel-cobalt-manganese composite hydroxide particles may be coated with the additive element M. In such a case, for example, in a way that the nickel-cobalt-manganese composite hydroxide particles are made into slurry with an aqueous solution containing the additive element M, and while controlling to predetermined pH, an aqueous solution containing one or more additive elements M is added to deposit the additive elements on the surfaces of the nickel-cobalt-manganese composite hydroxide particles through a crystallization reaction, the surfaces can be coated uniformly with the additive elements. In this case, in place of the aqueous solution containing the additive element M, an alkoxide solution of the additive element M may be used. Furthermore, the surfaces of the nickel-cobalt-manganese composite hydroxide particles can be also coated with the additive element M by spray-drying an aqueous solution or slurry containing the additive element M onto the nickel-cobalt-manganese composite hydroxide particles. In addition, the surfaces can be coated by a method such as spraying and drying slurry in which the nickel-cobalt-manganese composite hydroxide particles and a salt containing one or more additive elements M are suspended, or mixing the nickel-cobalt-manganese composite hydroxide and a salt containing one or more additive elements M by a solid-phase method.

It is to be noted that in the case of coating the surfaces of the nickel-cobalt-manganese composite hydroxide particles with the additive element M, the ratio of the atom number of additive element ions present in the mixed aqueous solution is reduced by the amount of coating, thereby making it possible to give agreement with the ratio of the atom number of metal ions of the nickel-cobalt-manganese composite hydroxide particles obtained.

The reaction mode in the crystallization step is not particularly limited, but a batch mode or a continuous mode can be used. The continuous mode is a mode in which the mixed aqueous solution, an aqueous solution containing the ammonium ion supplier, and an aqueous solution of caustic alkali are each continuously supplied to continuously overflow, from the reaction vessel, a reaction solution containing nickel-cobalt-manganese composite hydroxide particles, thereby collecting the nickel-cobalt-manganese composite hydroxide particles, and preferred in terms of productivity and stability.

In the case of the continuous mode, it is preferable to, while keeping the temperature constant, supply certain amounts of the mixed aqueous solution and ammonium ion supplier to the reaction vessel, control the pH through the addition of the aqueous solution of caustic alkali, and continuously sample generated particles with an overflow pipe after the reaction vessel reaches a steady state therein. It is to be noted that while it is also possible to mix the mixed aqueous solution and the aqueous solution of caustic alkali in advance, and then supply the mixture to the reaction vessel, it is preferable to supply the mixed aqueous solution and the aqueous solution of caustic alkali individually to the reaction vessel in order to prevent the nickel-cobalt-manganese composite hydroxide from being produced in the mixed aqueous solution in mixing with the aqueous solution of caustic alkali.

In the case of using any of the reaction modes, sufficient stirring is preferred in order to maintain a homogeneous reaction during the crystallization. In addition, it is preferable to use water with the impurity content reduced as much as possible, such as pure water, for the water for use in the crystallization step in order to prevent impurities from being mixed.

(2-2) Oxidation Step

The nickel-cobalt-manganese composite hydroxide particles obtained in the crystallization step are oxidized in the oxidation step. In the oxidation step, an oxidant is supplied to the slurry of nickel-cobalt-manganese composite hydroxide particles preferably while stirring the slurry so as to be uniformly oxidized, thereby oxidizing the nickel-cobalt-manganese composite hydroxide particles. In the oxidation step, the particles are oxidized so that the peak intensity ratio $[I(101)/I(100)]$ of the nickel-cobalt-manganese composite hydroxide is less than 0.300.

In the oxidation step, the nickel-cobalt-manganese composite hydroxide particles are oxidized to generate fine cracks in the particles and thus make the crystals finer, thereby lowering the peak intensity ratio and increasing the specific surface area. Thus the reactivity is improved between the nickel-cobalt-manganese composite hydroxide particles and a lithium compound.

When the nickel-cobalt-manganese composite hydroxide has high crystallinity, a peak for the plane (101) appears clearly. Therefore, in the case of high crystallinity, the peak intensity ratio is increased to lower the crystallinity, and the peak for the plane (101) is weakened to decrease the peak intensity ratio. From the foregoing, the oxidized nickel-cobalt-manganese composite hydroxide has, due to the crystals made finer by the generation of fine cracks, crystallinity decreased, thereby lowering the peak intensity ratio.

For the oxidant, while it is also possible to use an oxidant such as sodium hypochlorite and persulfate, the use of an expensive oxidant is disadvantageous in terms of cost in consideration of industrial productivity, and the oxidation with the use of oxygen is advantageous also in terms of cost from the perspective of suppressing impurity incorporation.

In the case of using oxygen as an oxidant, while the pH of the slurry of nickel-cobalt-manganese composite hydroxide particles is adjusted to 12.5 or more on the basis of 25° C., it is preferable to oxidize the nickel-cobalt-manganese composite hydroxide particles by supplying oxygen to the slurry. In addition, air may be supplied to the slurry as long as sufficient oxygen can be supplied In addition, the oxidation time with the oxygen supply is preferably adjusted to 1.5 to 10 hours, more preferably 2 to 7 hours. With the oxygen supply time less than 1.5 hours, regardless of the amount of oxygen supply per time, the reaction may fail to proceed until achieving sufficient oxidation of the nickel-cobalt-manganese composite hydroxide particles. On the other hand, when the oxygen supply time exceeds 10 hours, oxygen is not only wasted, but also causes the oxidation reaction to proceed excessively, thereby excessively increasing the specific surface area. Accordingly, the nickel-cobalt-manganese composite hydroxide particles can be oxidized efficiently and sufficiently by adjusting the oxygen supply time to 1.5 to 10 hours.

The presence of OH ions contained in the slurry of nickel-cobalt-manganese composite hydroxide accelerates the oxidation reaction, thereby allowing the oxidation of nickel hydroxide without using any expensive oxidant. Therefore, maintaining the concentration of the OH ions contained in the slurry, specifically, the pH of the slurry at 12.5 or more on the basis of 25° C. during the oxidation step can accelerate the oxidation reaction to accelerate the oxidation through oxygen supply into the slurry.

With the pH less than 12.5, insufficient acceleration of the oxidation reaction requires the oxidation reaction for a long period time, thereby decreasing industrial productivity, and when the oxidation reaction is terminated in a short period of time, insufficient oxidation fails to make the crystals finer, thereby degrading the reactivity with lithium compounds. On the other hand, even with the pH in excess of 13.5, the effect of accelerating the oxidation is not found to be improved as compared with a case of 13.5 or less, but an increase in alkali cost is only caused. Therefore, in the case of oxidization with the addition of oxygen in the oxidation step, the pH of the slurry is preferably maintained at 12.5 or more and 13.5 or less, more preferably kept at 12.5 or more and 13.0 or less on the basis of 25° C. For the pH adjustment to the slurry, it is preferable to use an aqueous solution of caustic alkali, and it is more preferable to use an aqueous solution of sodium hydroxide with less impurity incorporation.

As the slurry, the reaction solution with the nickel-cobalt-manganese composite hydroxide particles generated after the crystallization step may be directly used, or the nickel-cobalt-manganese composite hydroxide particles may be subjected to solid-liquid separation, and then again dispersed in water to obtain slurry for use.

The supply of the oxidant and the oxidation time are stabilized when the condition for the production is fixed, and may be thus appropriately determined by a preliminary test, depending on the crystallization condition, and the like. In addition, the device for use in the oxidation step is preferably able to supply an oxidant, or a pH adjuster and oxygen while stirring the slurry, and for example, a reaction vessel with a stirring device is used.

(2-3) Solid-Liquid Separation Step

In the solid-liquid separation step, the nickel-cobalt-manganese composite hydroxide particles are separated from the slurry containing the nickel-cobalt-manganese composite hydroxide particles oxidized in the oxidation step. In the solid-liquid separation step, the slurry is filtered, then washed with water, and filtered. The filtration may be a commonly used method, for example, a centrifuge or a suction filtration device is used. In addition, the water washing may be any commonly used method, as long as the method can remove the excess base, non-reducing complexing agent and the like included in the nickel-cobalt-manganese composite hydroxide particles. For the water for use in the water washing, in order to prevent impurities from being mixed, it is preferable to use water with the impurity content reduced as much as possible, and it is more preferable to use pure water.

(2-4) Drying Step

The nickel-cobalt-manganese composite hydroxide particles subjected to the solid-liquid separation is dried in the drying step. When this drying step is completed, the nickel-cobalt-manganese composite hydroxide is obtained.

The nickel-cobalt-manganese composite hydroxide particles are subjected to drying, preferably at a drying temperature of 100 to 230° C., in a non-oxidizing atmosphere.

In the case of drying in an oxidizing atmosphere, it is difficult to control the oxidation, and during the drying, the oxidation of the nickel-cobalt-manganese composite hydroxide particles may further proceed to excessively increase the specific surface area, thereby causing problems such as the peak intensity ratio excessively decreased. For this reason, it is preferable to dry the nickel-cobalt-manganese composite hydroxide particles in an atmosphere that can control the oxidation of the particles. An inert gas atmosphere such as a vacuum atmosphere or a nitrogen atmosphere with an oxygen concentration of 0.2 volume % or less is preferred as the drying atmosphere.

In addition, the drying temperature is preferably adjusted to 100 to 230° C. The drying temperature is the object temperature, that is, the maximum temperature of the nickel-cobalt-manganese composite hydroxide particles dried. Water evaporation is insufficient when the drying temperature is lower than 100° C., while the decomposition of the nickel-cobalt-manganese composite hydroxide proceeds to turn into a mixture with oxides when the drying temperature exceeds 230° C. When the oxides are present, the content of metals such as nickel per mass varies depending on the mixed amount of the oxides, thus making it difficult to combine the nickel-cobalt-manganese composite hydroxide accurately with a lithium compound in the step of producing a positive electrode active material, and making it difficult to achieve adequate battery characteristics from a positive electrode active material obtained.

As just described, in the method for producing the nickel-cobalt-manganese composite hydroxide, a reaction solution is obtained by mixing, in a reaction vessel, a mixed aqueous solution containing at least a nickel salt, a cobalt salt, and a manganese salt with an aqueous solution containing an ammonium ion supplier, and supplying an aqueous solution of caustic alkali so that the pH on the basis of a liquid temperature of 25° C. is maintained within the range of 11 to 13, nickel-cobalt-manganese composite hydroxide particles are crystallized in the reaction solution, an oxidant is supplied to slurry of the nickel-cobalt-manganese composite hydroxide particles to oxidize the nickel-cobalt-manganese composite hydroxide particles, thereby making the peak intensity ratio[I(101)/I(100)] through an X-ray diffraction measurement less than 0.300, and the nickel-cobalt-manganese composite hydroxide particles are subjected to solid-liquid separation and water washing, and then dried, thereby making it possible to provide nickel-cobalt-manganese composite hydroxide.

The obtained nickel-cobalt-manganese composite hydroxide has crystals moderately made fine, a low peak intensity ratio, and a specific surface area increased, and thus serves as a precursor for a positive electrode active material, from which a non-aqueous electrolyte secondary battery can be obtained which has high reactivity with a lithium compound and has excellent thermal stability and battery characteristics.

Therefore, a non-aqueous electrolyte secondary battery, in particular, a lithium ion secondary battery that uses a positive electrode active material produced from the obtained nickel-cobalt-manganese composite hydroxide has a high capacity and favorable cycle characteristics, and has excellent battery characteristics and safety.

EXAMPLES

While specific examples according to the present invention applied will be described below, the present invention is not limited to the examples. Further, here are evaluation methods for nickel-cobalt-manganese composite hydroxides and positive electrode active materials for non-aqueous electrolyte secondary batteries, which were used in the examples and the comparative examples.

(1) Analysis of Metal Component:

Analyses were made by ICP emission spectrometry with the use of an ICP emission spectrometer (Inductively Coupled Plasma) (from VARIAN, 725ES).

(2) Analysis of Ammonium Ion Concentration:

The concentration was measured by a distillation method in accordance with the JIS standards.

(3) Measurement of BET Specific Surface Area

The surface area was measured by a single-point BET method through nitrogen adsorption with the use of a specific surface area measuring instrument (from Yuasa Ionics Co., Ltd, Multisorb 16).

(4) Measurement of Average Particle Size and Evaluation of Particle Size Distribution Width:

The measurement of average particle sizes and the evaluation of particle size distribution widths were made on a volumetric basis, with the use of a laser diffraction particle size distribution meter (from Nikkiso Co., Ltd., Microtrac HRA).

(5) Measurement of Peak Intensity Ratio:

Powder X-ray diffraction measurement with Cu—Kα line was made with the use of an X-ray diffractometer (from PANalytical, X'Pert PRO). In the obtained X-ray diffraction pattern, the background was removed from peaks for each crystal plane, and the peak heights for the plane (100) and plane (101) were obtained from the maximum peak heights to calculate the peak intensity ratio.

(6) Evaluation of Reactivity:

The nickel-cobalt-manganese composite hydroxide was mixed with a lithium carbonate, and the mixture was then subjected to thermogravimetric measurement and differential thermal analysis (TG-DTA) up to 980° C. at a rate of temperature increase of 5° C./min with the use of a differential-type differential thermal balance (from Bruker AXS, TG-DTA2020SR) in a carbon dioxide gas atmosphere at 100 ml/min. The reactivity was evaluated on the presence or absence of an endothermic peak between 680 and 720° C. in the differential thermal analysis.

(7) Observation and Evaluation of Morphology:

After the sample subjected to the evaluation of the reactivity was subjected to grinding in a mortar, the observation of shapes and appearances and the evaluation on the presence or absence of agglomeration were made with the use of a scanning electron microscope (from JEOL Ltd., JSM-6360LA, hereinafter, referred to as a SEM).

Example 1

In Example 1, 4 L of pure water and 200 mL of 25 mass % ammonia water were put in an overflow-type crystallization reaction vessel of 5 L in tank volume with four baffles attached, and heated to 60° C. by a thermostatic bath and a heating jacket, and the pH of the reaction solution in the thermostatic bath was adjusted to 12.0 on the basis of a liquid temperature of 25° C. with the addition of a 25 mass % caustic soda solution.

Next, while stirring the reaction solution maintained at 60° C., a metering pump was used to continuously supply a mixed aqueous solution of: nickel sulfate with a nickel concentration of 0.667 mol/L; cobalt sulfate with a cobalt concentration of 0.667 mol/L; and manganese sulfate with a manganese concentration of 0.667 mol/L (hereinafter, referred to as a mixed aqueous solution) at 10 ml/min, and also 25 mass % ammonia water at 1.5 ml/min, with the addition of a 25 mass % caustic soda solution, thereby developing a crystallization reaction by control of the pH on the basis of a liquid temperature of 25° C. to 12.0 and of the ammonium ion concentration to 5 to 15 g/L.

The stirring for the crystallization was carried out by horizontal rotation at a rotation speed of 800 rpm with the use of six turbine blades of 8 cm in diameter. In addition, as a method for supplying the mixed aqueous solution into the reaction system, an injection nozzle to serves as a supply port was inserted into the reaction solution in such a way that the mixed aqueous solution was supplied directly into the reaction solution.

The nickel-cobalt-manganese composite hydroxide particles generated by the crystallization reaction were continuously extracted through overflow. While stirring the slurry containing the nickel-cobalt-manganese composite hydroxide particles extracted over 48 to 72 hours from the start of the reaction stabilized, a sodium hydroxide was added thereto to increase the pH to 12.8 on the basis of a liquid temperature of 25° C., thereby providing slurry for use in the oxidation step.

Next, air was blown into the slurry for 3 hours at a flow rate of 3 L/min to oxidize the nickel-cobalt-manganese hydroxide particles.

Next, the slurry was subjected to solid-liquid separation with the use of a Buchner funnel and a suction bottle, and then washed with water to obtain a filtered product. This filtered product was dried by keeping the product at a drying temperature of 120° C. for 12 hours in a vacuum dryer, thereby providing the nickel-cobalt-manganese composite hydroxide.

In the obtained nickel-cobalt-manganese composite hydroxide, the grade of nickel was 21.5 wt %, the grade of cobalt was 21.5 wt %, and the grade of manganese was 19.8 wt %, the proportions of the respective elements were 33.6:33.4:33.0 nearly equal to the composition ratios of the raw material aqueous solution, and the average particle size was 10.5 μm. In addition, the specific surface area was 7.7 m$^2$/g, the peak intensity ratio through the X-ray diffraction measurement was 0.120. These values are shown in Table 1.

Figure 1:
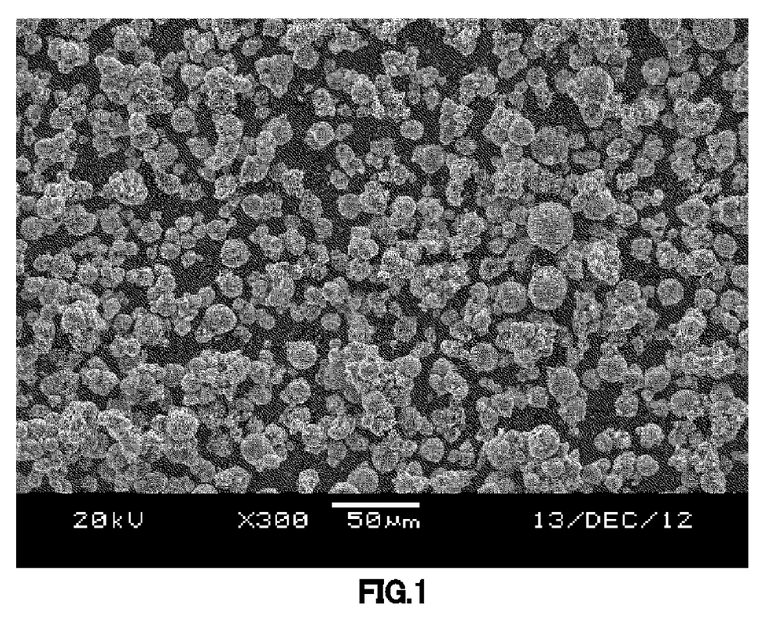
FIG. 1 is a scanning electron micrograph of a sample obtained after increasing, under a carbon dioxide gas atmosphere, the temperature of a mixture of a nickel-cobalt-manganese composite hydroxide obtained in Example 1 and a lithium compound.

The obtained nickel-cobalt-manganese composite hydroxide was mixed with a lithium carbonate, and then, when the mixture was subjected to a TG-DTA measurement up to 980° C. at a rate of temperature increase of 5° C./min in a carbon dioxide gas atmosphere at 100 ml/min, no endothermic peak was observed between 680 and 720° C. In addition, when the sample subjected to the TG-DTA measurement was observed by a scanning electron microscope, no agglomeration was confirmed as shown in FIG. 1. The evaluation result is shown in Table 1. Furthermore, Table 1 shows the result of measuring the mesopore volume by a nitrogen adsorption method for the nickel-cobalt-manganese composite hydroxide.

Example 2

In Example 2, a nickel-cobalt-manganese composite hydroxide was obtained and subjected to each evaluation in the same way as in Example 1 except that air was blown for 5 hours at a flow rate of 3 L/min to oxidize nickel-cobalt-manganese composite hydroxide particles. The specific surface area of the obtained nickel-cobalt-manganese composite hydroxide was 8.6 m$^2$/g, and the peak intensity ratio through the X-ray diffraction measurement was 0.082.

The obtained nickel-cobalt-manganese composite hydroxide was mixed with a lithium carbonate, and then, when the mixture was subjected to a TG-DTA measurement up to 980° C. at a rate of temperature increase of 5° C./min in a carbon dioxide gas atmosphere at 100 ml/min, no endothermic peak was observed between 680 and 720° C. In addition, in the sample subjected to the TG-DTA measurement, no agglomeration was confirmed. Table 1 shows the presence or absence of an endothermic peak between 680 and 720° C. and the presence or absence of agglomeration observed by the SEM. Furthermore, Table 1 shows the result of measuring the mesopore volume by a nitrogen adsorption method for the nickel-cobalt-manganese composite hydroxide.

Example 3

In Example 3, a nickel-cobalt-manganese composite hydroxide was obtained and subjected to each evaluation in the same way as in Example 1 except that while stirring the slurry, a sodium hydroxide was added thereto to increase the pH on the basis of a liquid temperature of 25° C. to 12.5, before oxidizing nickel-cobalt-manganese composite hydroxide particles. The specific surface area of the obtained nickel-cobalt-manganese composite hydroxide was 7.0 m$^2$/g, and the peak intensity ratio through the X-ray diffraction measurement was 0.184.

The obtained nickel-cobalt-manganese composite hydroxide was mixed with a lithium carbonate, and then, when the mixture was subjected to a TG-DTA measurement up to 980° C. at a rate of temperature increase of 5° C./min in a carbon dioxide gas atmosphere at 100 ml/min, no endothermic peak was observed between 680 and 720° C. In addition, in the sample subjected to the TG-DTA measurement, no agglomeration was confirmed. Table 1 shows the presence or absence of an endothermic peak between 680 and 720° C. and the presence or absence of agglomeration observed by the SEM. Furthermore, Table 1 shows the result of measuring the mesopore volume by a nitrogen adsorption method for the nickel-cobalt-manganese composite hydroxide.

Comparative Example 1

In Comparative Example 1, a nickel-cobalt-manganese composite hydroxide was obtained and subjected to each evaluation in the same way as in Example 1 except that nickel-cobalt-manganese composite hydroxide particles were not oxidized after the crystallization. The specific surface area of the obtained nickel-cobalt-manganese composite hydroxide was 2.7 m$^2$/g, and the peak intensity ratio through the X-ray diffraction measurement was 0.452.

Figure 2:
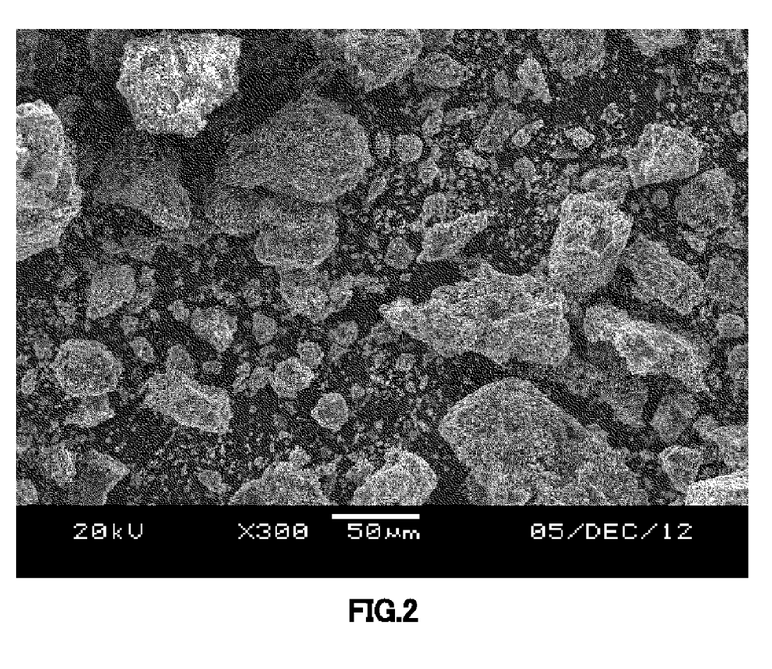
FIG. 2 is a scanning electron micrograph of a sample obtained after increasing, under a carbon dioxide gas atmosphere, the temperature of a mixture of a nickel-cobalt-manganese composite hydroxide obtained in Comparative Example 1 and a lithium compound.

The obtained nickel-cobalt-manganese composite hydroxide was mixed with a lithium carbonate, and then, when the mixture was subjected to a TG-DTA measurement up to 980° C. at a rate of temperature increase of 5° C./min in a carbon dioxide gas atmosphere at 100 ml/min, an endothermic peak was observed between 680 and 720° C. In addition, in the sample subjected to the TG-DTA measurement, agglomeration was confirmed. FIG. 2 shows a scanning electron micrograph of the sample subjected to the TG-DTA measurement. Table 1 shows the presence or absence of an endothermic peak between 680 and 720° C. and the presence or absence of agglomeration observed by the SEM. Furthermore, Table 1 shows the result of measuring the mesopore volume by a nitrogen adsorption method for the nickel-cobalt-manganese composite hydroxide.

Comparative Example 2

In Comparative Example 2, a nickel-cobalt-manganese composite hydroxide was obtained and subjected to each evaluation in the same way as in Example 1 except that without adding any sodium hydroxide to the slurry subjected to crystallization, air was blown for 3 hours at a flow rate of 3 L/min while the pH on the basis of a liquid temperature of 25° C. was kept at 12.0, thereby oxidizing nickel-cobalt-manganese composite hydroxide particles. The specific surface area of the obtained nickel-cobalt-manganese composite hydroxide was 4.5 m$^2$/g, and the peak intensity ratio through the X-ray diffraction measurement was 0.431.

The obtained nickel-cobalt-manganese composite hydroxide was mixed with a lithium carbonate, and then, when the mixture was subjected to a TG-DTA measurement up to 980° C. at a rate of temperature increase of 5° C./min in a carbon dioxide gas atmosphere at 100 ml/min, an endothermic peak was observed between 680 and 720° C. In addition, in the sample subjected to the TG-DTA measurement, agglomeration was confirmed. Table 1 shows the presence or absence of an endothermic peak between 680 and 720° C. and the presence or absence of agglomeration observed by the SEM. Furthermore, Table 1 shows the result of measuring the mesopore volume by a nitrogen adsorption method for the nickel-cobalt-manganese composite hydroxide.

Comparative Example 3

In Comparative Example 3, a nickel-cobalt-manganese composite hydroxide was obtained and subjected to each evaluation in the same way as in Example 1 except that air was blown for 1 hour at a flow rate of 3 L/min to oxidize nickel-cobalt-manganese composite hydroxide particles. The specific surface area of the nickel-cobalt-manganese composite hydroxide was 5.9 m$^2$/g, and the peak intensity ratio through the X-ray diffraction measurement was 0.304.

The obtained nickel-cobalt-manganese composite hydroxide was mixed with a lithium carbonate, and then, when the mixture was subjected to a TG-DTA measurement up to 980° C. at a rate of temperature increase of 5° C./min in a carbon dioxide gas atmosphere at 100 ml/min, an endothermic peak was observed between 680 and 720° C. In addition, in the sample subjected to the TG-DTA measurement, agglomeration was confirmed. Table 1 shows the presence or absence of an endothermic peak between 680 and 720° C. and the presence or absence of agglomeration observed by the SEM. Furthermore, Table 1 shows the result of measuring the mesopore volume by a nitrogen adsorption method for the nickel-cobalt-manganese composite hydroxide.

TABLE 1

| | Oxidation Step (pH) | Air Blowing Time (hr) | Specific Surface Area (m2/g) | Peak Intensity Ratio | Pore Volume (ml/g) | Endothermic Peak | agglomeration |
|---|---|---|---|---|---|---|---|
| Example 1 | 12.8 | 3 | 7.7 | 0.120 | 0.020 | Absent | Absent |
| Example 2 | 12.8 | 5 | 8.6 | 0.082 | 0.026 | Absent | Absent |
| Example 3 | 12.5 | 3 | 7.0 | 0.184 | 0.015 | Absent | Absent |
| Comparative Example 1 | — | — | 2.7 | 0.452 | 0.008 | Present | Present |
| Comparative Example 2 | 12.0 | 3 | 4.5 | 0.431 | 0.009 | Present | Present |
| Comparative Example 3 | 12.8 | 1 | 5.9 | 0.304 | 0.012 | Present | Present |

From the results shown in Table 1, as in Examples 1 to 3, the nickel-cobalt-manganese composite hydroxides obtained by adjusting the pH of the slurry of nickel-cobalt-manganese composite hydroxide particles to 12.5 or more and adjusting the air blowing time within 1.5 to 10 hours in the oxidation step have achieved specific surface areas of 3.0 to 11.0 m$^2$/g and peak intensity ratios of less than 0.300.

It is determined that the nickel-cobalt-manganese composite hydroxide with the specific surface area and peak intensity ratio within desired ranges as just described, without any endothermic peak between 680 and 720° C., is likely to cause the reaction with the lithium compound to proceed, thereby causing the reaction between the nickel-cobalt-manganese composite hydroxide and a lithium carbonate to proceed preferentially rather than fusion of the lithium carbonate in a carbon dioxide gas atmosphere, without any unreacted residual lithium carbonate.

In addition, in Examples 1 to 3, as shown in FIG. 1, the residual lithium carbonate caused no agglomeration.

From the foregoing, it is determined that the nickel-cobalt-manganese composite hydroxides according to Examples 1 to 3 have high reactivity with the lithium compounds.

On the other hand, in Comparative Example 1 without any oxidation treatment applied to the nickel-cobalt-manganese composite hydroxide, the peak intensity ratio was greater than 0.300, the specific surface area was not increased, and an endothermic peak was observed between 680 and 720° C. In Comparative Example 1, with unreacted residual lithium carbonate in the carbon dioxide gas atmosphere, agglomeration of the residual lithium carbonate was confirmed as shown in FIG. 2. Accordingly, it is determined that Comparative Example 1 has low reactivity with the lithium compound.

Also in Comparative Example 2 where the pH of the slurry of nickel-cobalt-manganese composite hydroxide particles was smaller than 12.5 in the oxidation step, and Comparative Example 3 where the air blowing time was short therein, the peak intensity ratio is greater than 0.300, and an endothermic peak was observed between 680 to 720° C. In Comparative Example 2 and Comparative Example 3, with unreacted residual lithium carbonate in the carbon dioxide gas atmosphere, agglomeration of the residual lithium carbonate was confirmed. Accordingly, it is determined that Comparative Example 2 and Comparative Example 3 also have low reactivity with the lithium compounds.

The invention claimed is:

1. A nickel-cobalt-manganese composite hydroxide represented by a general formula: $Ni_{1-x-y-z}Co_xMn_yM_z$ $(OH)_2$ ($0<x\leq\frac{1}{3}$, $0<y\leq\frac{1}{3}$, $0\leq z\leq0.1$, M represents one or more elements selected from Mg, Al, Ca, Ti, V, Cr, Zr, Nb, Mo, and W), to serve as a precursor for a positive electrode active material of a non-aqueous electrolyte secondary battery,
wherein the nickel-cobalt-manganese composite hydroxide has a specific surface area of 3.0 to 11.0 $m^2/g$ as measured by a nitrogen adsorption BET method, a ratio I(101)/I(100) of peak intensity I(101) of plane (101) to peak intensity I(100) of plane (100) less than 0.300 through an X-ray diffraction measurement, and a mesopore volume of 0.010 to 0.035 ml/g as measured by a nitrogen adsorption method.

2. The nickel-cobalt-manganese composite hydroxide according to claim 1, wherein the nickel-cobalt-manganese composite hydroxide has an average particle size of 5 to 15 μm on a volumetric basis by a laser diffraction/scattering method.

3. A method for producing a nickel-cobalt-manganese composite hydroxide represented by a general formula: $Ni_{1-x-y-z}Co_xMn_yM_z$ $(OH)_2$ ($0<x\leq\frac{1}{3}$, $0<y\leq\frac{1}{3}$, $0\leq z\leq0.1$, M represents one or more elements selected from Mg, Al, Ca, Ti, V, Cr, Zr, Nb, Mo, and W), to serve as a precursor for a positive electrode active material of a non-aqueous electrolyte secondary battery, the method comprising:
a crystallization step of mixing, in a reaction vessel, a mixed aqueous solution containing at least a nickel salt, a cobalt salt, and a manganese salt, and an aqueous solution containing an ammonium ion supplier, and supplying an aqueous solution of caustic alkali so that pH on the basis of a liquid temperature of 25° C. is kept in a range of 11 to 13, thereby providing a reaction solution, and crystallizing nickel-cobalt-manganese composite hydroxide particles in the reaction solution, while maintaining an oxygen concentration of an atmosphere in contact with an open side of the reaction solution at 0.2 volume % or less by supplying an inert gas into the reaction vessel;
an oxidation step of supplying an oxidant to slurry of the nickel-cobalt-manganese composite hydroxide particles formed in the crystallization step to oxidize the nickel-cobalt-manganese composite hydroxide particles, thereby making a ratio I(101)/I(100) of peak intensity I(101) of plane (101) to peak intensity I(100) of plane (100) through an X-ray diffraction measurement less than 0.300;
a solid-liquid separation step of applying solid-liquid separation and water washing to the oxidized nickel-cobalt-manganese composite hydroxide particles; and
a drying step of drying the nickel-cobalt-manganese composite hydroxide particles subjected to the solid-liquid separation.

4. The method for producing a nickel-cobalt-manganese composite hydroxide according to claim 3, wherein the nickel-cobalt-manganese composite hydroxide particles are oxidized by supplying oxygen as the oxidant to the slurry with the pH of the slurry adjusted to 12.5 or more on the basis of 25° C. in the oxidation step.

5. The method for producing a nickel-cobalt-manganese composite hydroxide according to claim 3, wherein the reaction solution has a temperature maintained in a range of 20 to 70° C., and an ammonium ion concentration maintained in a range of 5 to 20 g/L in the crystallization step.

6. The method for producing a nickel-cobalt-manganese composite hydroxide according to claim 3, wherein the mixed aqueous solution, the aqueous solution containing the ammonium ion supplier, and the aqueous solution of caustic alkali are each continuously supplied to continuously overflow the reaction solution containing the nickel-cobalt-manganese composite hydroxide particles from the reaction vessel, and collect the nickel-cobalt-manganese composite hydroxide particles.

7. The method for producing a nickel-cobalt-manganese composite hydroxide according to claim 3, wherein the nickel-cobalt-manganese composite hydroxide particles have surfaces coated with a hydroxide of an additive element M.

8. The method for producing a nickel-cobalt-manganese composite hydroxide according to claim 3, wherein the nickel salt, the cobalt salt, and the manganese salt are at least one of a sulfate, a nitrate, or a chloride.

9. The method for producing a nickel-cobalt-manganese composite hydroxide according to claim 3, wherein the ammonium ion supplier is at least one of ammonia, ammonium sulfate, or ammonium chloride.

10. The nickel-cobalt-manganese composite hydroxide according to claim 1, wherein the nickel-cobalt-manganese composite hydroxide is produced by a method comprising:
a crystallization step of mixing, in a reaction vessel, a mixed aqueous solution containing at least a nickel salt, a cobalt salt, and a manganese salt, and an aqueous solution containing an ammonium ion supplier, and supplying an aqueous solution of caustic alkali so that pH on the basis of a liquid temperature of 25° C. is kept in a range of 11 to 13, thereby providing a reaction solution, and crystallizing nickel-cobalt-manganese composite hydroxide particles in the reaction solution, while maintaining an oxygen concentration of an atmosphere in contact with an open side of the reaction solution at 0.2 volume % or less by supplying an inert gas into the reaction vessel;
an oxidation step of supplying an oxidant to slurry of the nickel-cobalt-manganese composite hydroxide particles formed in the crystallization step to oxidize the nickel-cobalt-manganese composite hydroxide particles, thereby making a ratio I(101)/I(100) of peak intensity I(101) of plane (101) to peak intensity I(100) of plane (100) through an X-ray diffraction measurement less than 0.300;

a solid-liquid separation step of applying solid-liquid separation and water washing to the oxidized nickel-cobalt-manganese composite hydroxide particles; and a drying step of drying the nickel-cobalt-manganese composite hydroxide particles subjected to the solid-liquid separation.

* * * * *